US012804063B2

(12) United States Patent
Bicudo et al.

(10) Patent No.: US 12,804,063 B2
(45) Date of Patent: Nov. 17, 2026

(54) MOUNTING APPARATUS AND SYSTEM FOR A PORTABLE COMMUNICATION DEVICE

(71) Applicant: MOTOROLA SOLUTIONS, INC., Chicago, IL (US)

(72) Inventors: Felippe Morais Bicudo, Lighthouse Point, FL (US); Lanting L Garra, Sunrise, FL (US); Ryan M Nilsen, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 469 days.

(21) Appl. No.: 18/466,219

(22) Filed: Sep. 13, 2023

(65) Prior Publication Data

US 2024/0121331 A1 Apr. 11, 2024

Related U.S. Application Data

(60) Provisional application No. 63/414,116, filed on Oct. 7, 2022.

(51) Int. Cl.
*H04M 1/02* (2006.01)

(52) U.S. Cl.
CPC ......... *H04M 1/0254* (2013.01); *H04M 1/026* (2013.01)

(58) Field of Classification Search
CPC .. H04M 1/026; H04M 1/0254; H04M 1/0203; H04M 1/6075; H04M 1/724098
See application file for complete search history.

(56) References Cited

U.S. PATENT DOCUMENTS 5,179,590 A * 1/1993 Wang .................. B60R 11/0241 224/567
2011/0123050 A1* 5/2011 Garra ................ B65H 75/4473 381/364
2013/0170823 A1 7/2013 McDonald et al.
(Continued)

OTHER PUBLICATIONS (KR 20130021752 A), Sim, Charging and communication system in wireless for car, Mar. 2013, pp. 1-13, (Year: 2013).*
(Continued)

*Primary Examiner* — Keith Ferguson
(74) *Attorney, Agent, or Firm* — Raguraman Kumaresan

(57) ABSTRACT

A mounting apparatus and system for a portable communication device is disclosed. The apparatus includes a mounting plate configured to be attached to a planar surface. The mounting plate has elastically bendable arms adapted to engage around peripheral portions of a portable communication device and to secure the device with the mounting plate. The device has a front-facing PTT button that is configured to transmit a non-voice based signal notification when the PTT button is depressed and when the device is secured to the mounting plate. The apparatus includes a modular electronic accessory that aligns with top or bottom surfaces of the device when the device is secured with the mounting plate. The accessory may include a speaker microphone or camera. When the PTT button is pressed, a bidirectional audio-only call, an audio-video call, or an access control function is established depending on the type of accessory that is aligned with the portable communication device.

18 Claims, 10 Drawing Sheets

(56) References Cited

U.S. PATENT DOCUMENTS

| | | | | |
|---|---|---|---|---|
| 2015/0189048 | A1* | 7/2015 | Mclaughlin | H04M 1/04 455/569.1 |
| 2018/0302948 | A1* | 10/2018 | Kotlyarov | H04M 1/23 |
| 2021/0041057 | A1 | 2/2021 | Jankura et al. | |
| 2021/0090360 | A1* | 3/2021 | Vandenbussche | G07C 5/008 |

OTHER PUBLICATIONS (KR 20090110740 A), Yoo, Apparatus of Recording Image in the Vehicle, Operating Method Thereof and Medium of Recording Program Processing the Operating Method, Oct. 2009, pp. 1-14 (Year: 2009).*

Provisional Opinion Accompanying the Partial Search Result, corresponding patent application serial No. PCT/US2023/033581, filed Sep. 25, 2023, mailed Jan. 3, 2024, all pages.

The International Search Report and the Written Opinion, corresponding patent application No. PCT/US2023/033581, filed: Sep. 25, 2023, mailed: Feb. 26, 2024, all pages.

* cited by examiner

MOUNTING APPARATUS AND SYSTEM FOR A PORTABLE COMMUNICATION DEVICE

BACKGROUND

Push-to-talk (PTT) handsets have been used for some time by emergency personnel but also have recently begun to grow in general popularity. PTT handsets contain a PTT button that enables the user to communicate with a group of users on the same channel. In existing handsets, the PTT button is located on a side surface. In some situations, when PTT handsets are mounted on a surface, it may not be convenient for users to access a PTT button that is located on a side surface. In addition, there is a need for operating wall-mounted PTT handsets in different communication modes in case of emergency situations or while being operated in specific environments such as retail, school, and healthcare environments.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
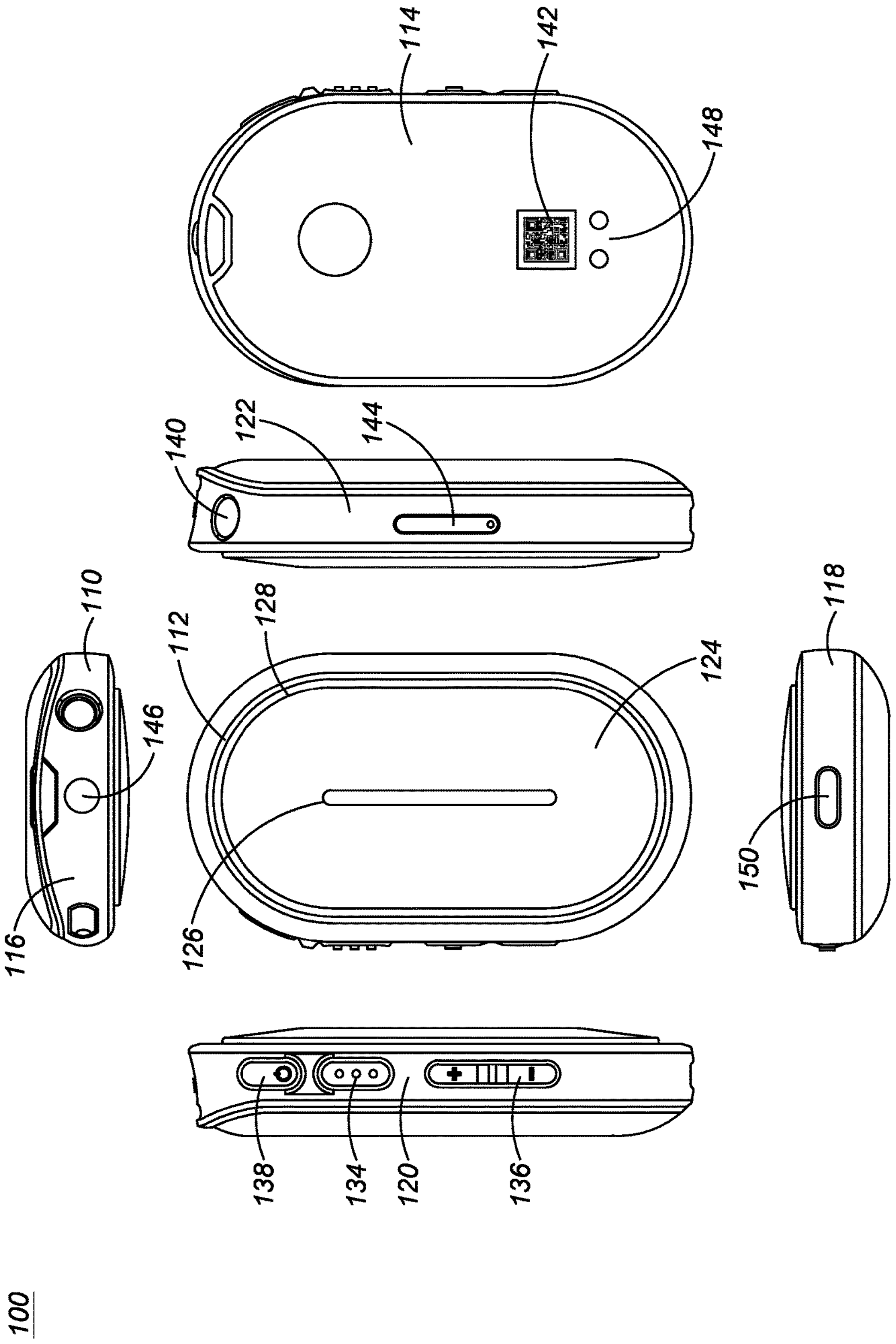
FIG. 1 illustrates front, rear, top, bottom, left-side, and right-side views of a portable communication device in accordance with some embodiments.
Figure 2:
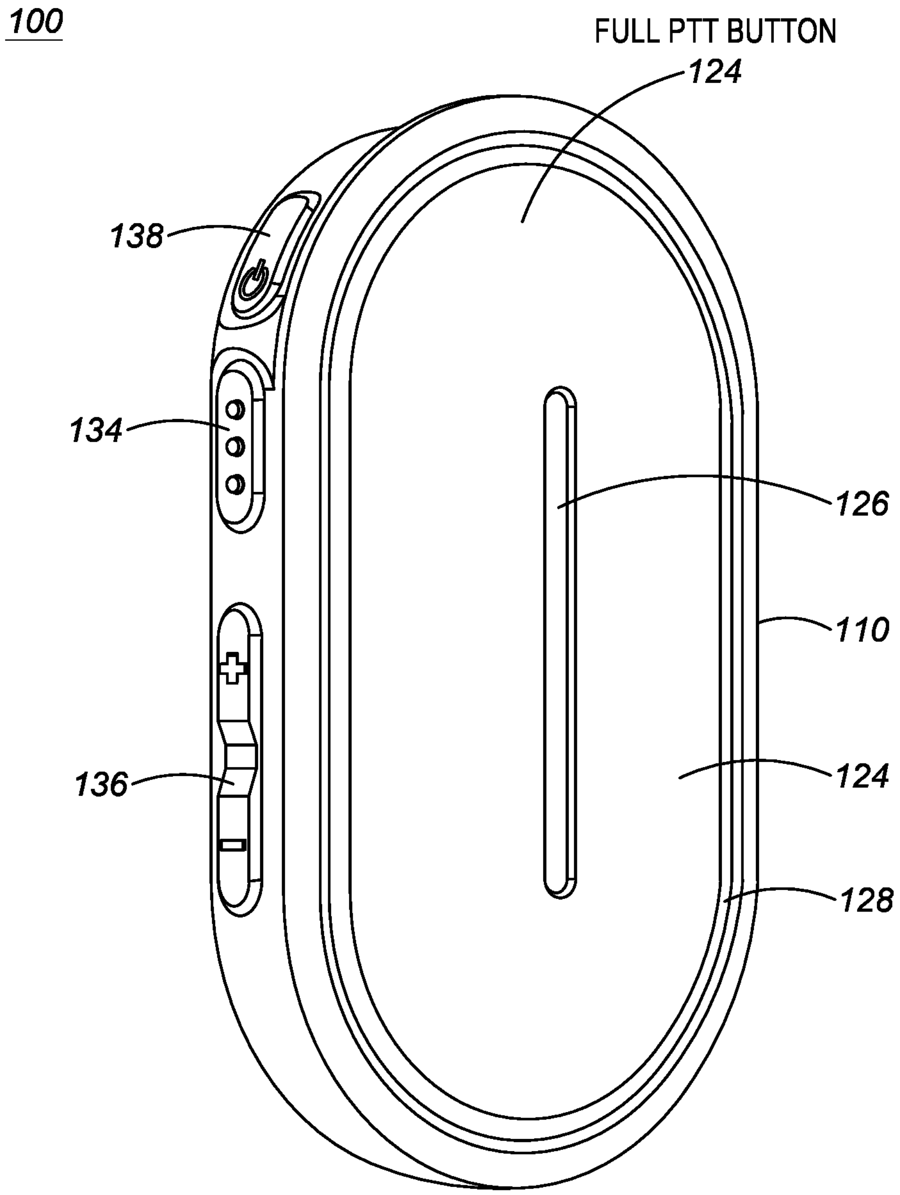
FIG. 2 illustrates a front perspective view of the portable communication device in accordance with some embodiments.
Figure 3:
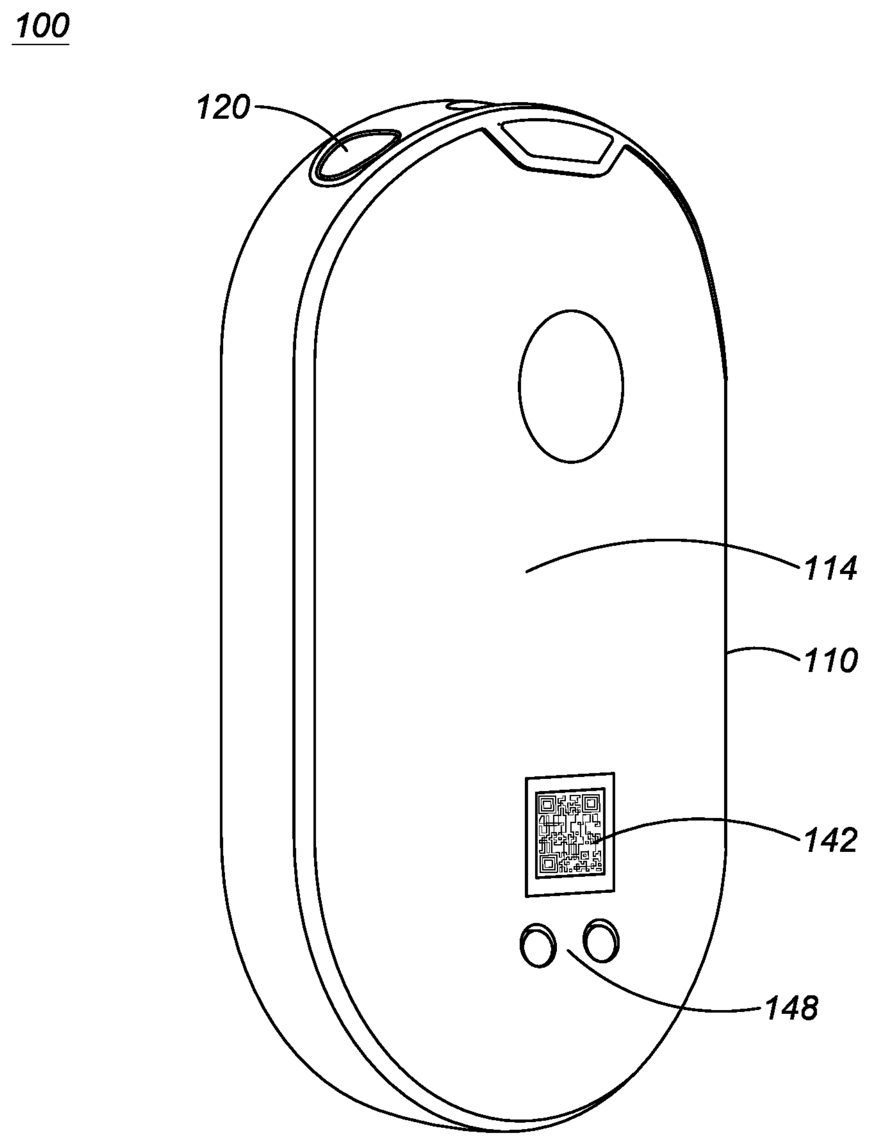
FIG. 3 illustrates a rear perspective view of the portable communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

One embodiment provides a mounting apparatus for a portable communication device. The mounting apparatus comprises a mounting plate configured to be attached to a planar surface. The mounting plate has one or more elastically bendable arms adapted to engage around one or more peripheral portions of the portable communication device and to secure the portable communication device with the mounting plate. The mounting apparatus further comprises a modular accessory which includes an accessory housing having a cutout alignment feature adapted to align with a top surface or a bottom surface of the portable communication device; one or more locking elements disposed on the accessory housing, the locking elements adapted to be inserted within the one or more elastically bendable arms by aligning the cutout alignment feature with the top surface or the bottom surface of the portable communication device when the portable communication device is secured with the mounting plate; and one or more modular electronic components disposed in the accessory housing.

Another embodiment provides a mounting apparatus for a portable communication device. The mounting apparatus comprises: a mounting plate configured to be attached to a planar surface, the mounting plate having one or more elastically bendable arms adapted to engage around one or more peripheral portions of the portable communication device and to secure the portable communication device with the mounting plate; and an electronic controller configured to detect whether the portable communication device is secured with the mounting plate and further switch an operation of the portable communication device from a first communication mode to a second communication mode in response to detecting that the portable communication device is secured with the mounting plate.

A further embodiment provides a mounting system comprising: a portable communication device including a housing and a push-to-talk (PTT) button disposed on a front surface of the housing, the PTT button occupying a substantial portion of the front surface of the housing; and a mounting plate configured to be attached to a planar surface, the mounting plate having one or more elastically bendable arms adapted to engage around one or more peripheral portions of the portable communication device and to secure the portable communication device with the mounting plate.

A further embodiment provides a mounting system comprising a portable communication device, a mounting plate, and a speaker microphone accessory. The portable communication device includes a housing and a push-to-talk (PTT) button disposed on a front surface of the housing, the PTT button occupying a substantial portion of the front surface of the housing. The mounting plate is configured to be attached to a planar surface, the mounting plate having one or more elastically bendable arms adapted to engage around one or more peripheral portions of the portable communication device and to secure the portable communication device with the mounting plate. The speaker microphone accessory includes: an accessory housing having a cutout alignment feature adapted to align with a top surface or a bottom surface of the portable communication device; one or more second locking elements disposed on the accessory housing, the second locking elements adapted to be inserted within the one or more elastically bendable arms by aligning the cutout alignment feature with the top surface or the bottom surface of the portable communication device when the portable communication device is secured with the mounting plate; and a speaker microphone component disposed in the accessory housing.

A further embodiment provides a mounting system comprising a portable communication device, a mounting plate, a speaker microphone accessory, and video camera accessory. The portable communication device includes a housing and a push-to-talk (PTT) button disposed on a front surface of the housing, the PTT button occupying a substantial portion of the front surface of the housing. The mounting plate is configured to be attached to a planar surface, the mounting plate having one or more elastically bendable arms adapted to engage around one or more peripheral portions of the portable communication device and to secure the portable communication device with the mounting plate. The speaker microphone accessory includes: a first accessory housing having a first cutout alignment feature adapted to align with a top surface or a bottom surface of the portable communication device; one or more first locking elements disposed on the accessory housing, the first locking elements adapted to be inserted within the one or more elastically bendable arms by aligning the first cutout alignment feature with the top surface or the bottom surface of the portable communication device when the portable communication device is secured with the mounting plate; and a speaker microphone component disposed in the first accessory housing. The video camera accessory includes a second accessory housing having a second cutout alignment feature adapted to align with a top surface or a bottom surface of the portable communication device; one or more second locking elements disposed on the accessory housing, the second locking elements adapted to be inserted within the one or more elastically bendable arms by aligning the second cutout alignment feature with the top surface or the bottom surface of the portable communication device when the portable communication device is secured with the mounting plate; and a video camera component disposed in the second accessory housing.

A further embodiment provides a portable communication device, a mounting plate, and a camera accessory. The portable communication device includes a housing and a push-to-talk (PTT) button disposed on a front surface of the housing, the PTT button occupying a substantial portion of the front surface of the housing. The mounting plate is configured to be attached to a planar surface, the mounting plate having one or more elastically bendable arms adapted to engage around one or more peripheral portions of the portable communication device and to secure the portable communication device with the mounting plate. The camera accessory includes an accessory housing having a cutout alignment feature adapted to align with a top surface or a bottom surface of the portable communication device; one or more second locking elements disposed on the accessory housing, the second locking elements adapted to be inserted within the one or more elastically bendable arms by aligning the cutout alignment feature with the top surface or the bottom surface of the portable communication device when the portable communication device is secured with the mounting plate; and a camera component disposed in the accessory housing.

Each of the above embodiments will be discussed in more detail below. Further advantages and features consistent with this disclosure will be set forth in the following detailed description, with reference to the figures.

Referring now to FIGS. 1-7, a portable communication device 100 is shown. The portable communication device 100 includes a housing 110 with multiple surfaces including a front surface 112, a rear surface 114, a top surface 116, a bottom surface 118, a left-side surface 120, and a right-side surface 122. The front surface 112 of the housing 110 includes a push-to-talk (PTT) button 124 (also referred to as a full-front PTT button or a front-facing PTT button) and a light emitting diode (LED) stripe 126 disposed on the PTT button 124. In accordance with embodiments, the PTT button 124 is large enough to substantially occupy the front surface 112 of the housing 110. As shown in FIGS. 1-6, the PTT button 124 occupies a substantial portion of the front surface 112 of the housing 110. In one embodiment, the PTT button 124 is configured to occupy at least 75% of the front surface 112 of the housing 110. In another embodiment, the PTT button 124 is configured to occupy at least 90% of the button surface.

The PTT button 124 is configured to activate transmission of a PTT signal (e.g., when operating in half-duplex communication mode) on a selected talk group channel when the PTT button 124 is depressed. In accordance with embodiments, any portion of the PTT button 124 located on the front surface of the housing can be depressed to activate PTT transmission. As an example, the PTT button 124 is configured to be activable across the entirety of the PTT button 124 surface.

Figure 4:
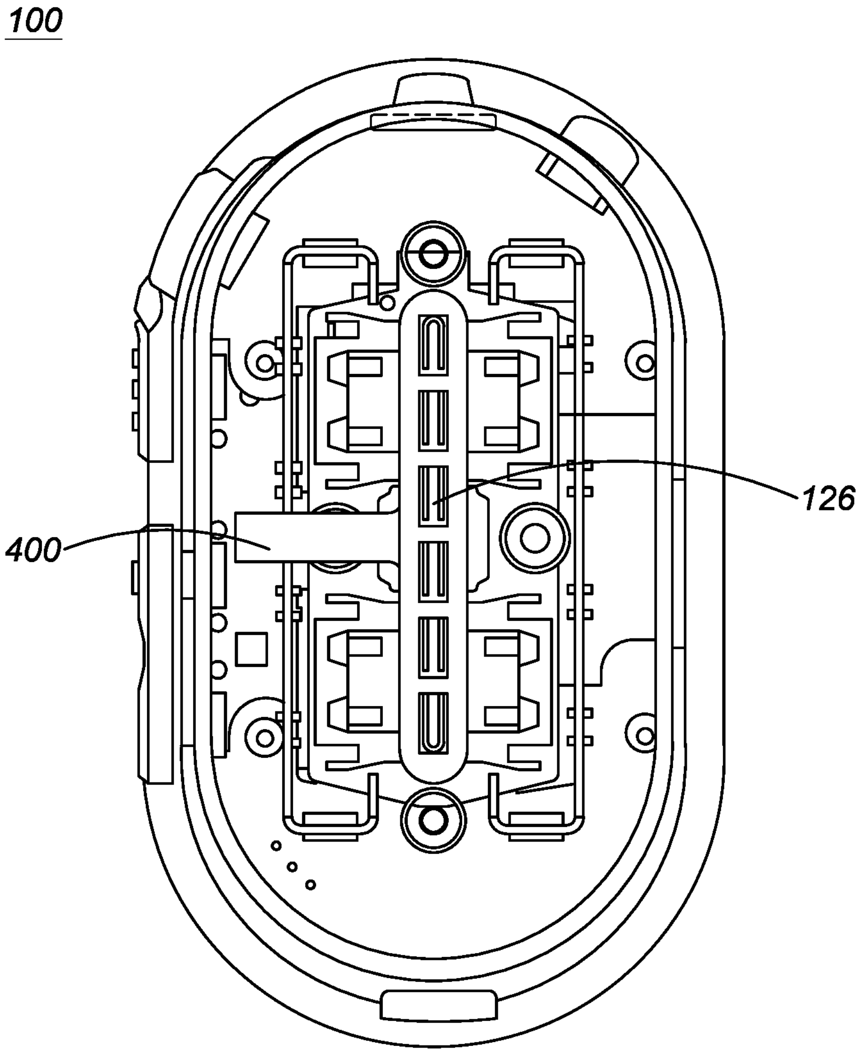
FIG. 4 illustrates a cross-sectional view of the portable communication device in accordance with some embodiments.
Figure 5:
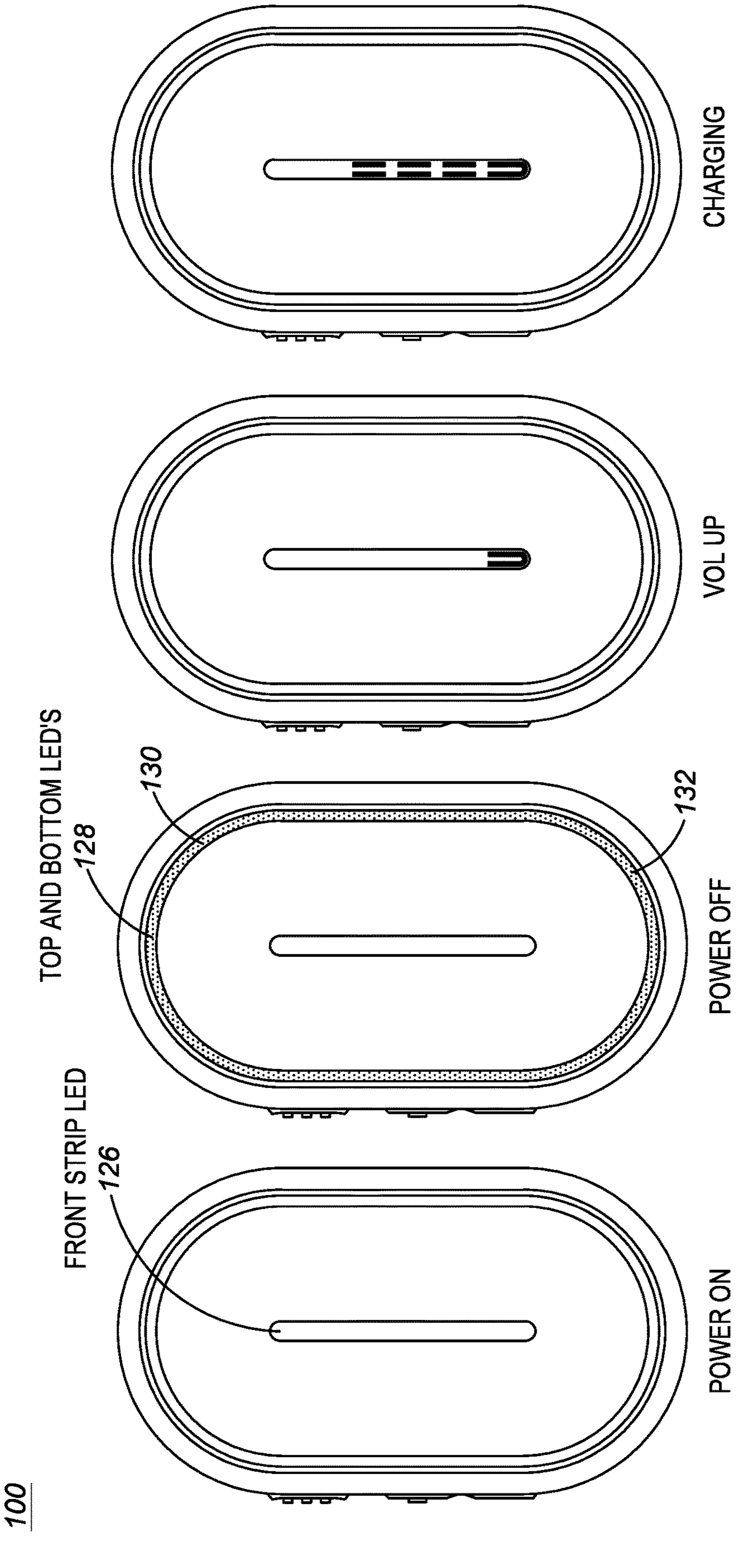
FIG. 5 illustrates different applications of light emitting diode components disposed at the portable communication device in accordance with some embodiments.

The portable communication device 100 includes a light emitting diode (LED) stripe 126 disposed on the PTT button 124. In accordance with some embodiments, as shown in FIG. 4, the LED stripe 126 is placed on a flexible cable 400 (see FIG. 4) connecting to a rigid printed circuit board (PCB) disposed in the housing 110 so as to move the LED stripe 126 together with the PTT button 124 when any portion of the front surface 112 of the housing 110 containing the LED stripe 126 and the PTT button 124 is depressed. In these embodiments, a user can also depress the LED stripe 126 disposed on the front surface 112 of the housing 110 to activate PTT transmission. The LED stripe 126 is configured to be activated to provide a feedback indication comprising at least one of: battery status, connectivity status, volume status, and startup and turn off sequence status. In FIG. 5, the LED stripe 126 is shown as indicating volume/charging status.

The portable communication device 100 further comprises a translucent light emitting diode (LED) ring 128 arranged peripheral to the PTT button 124 on the front surface of the housing 110. The LED ring 128 comprises LED elements 130, 132 configured to be activated to provide a feedback indication comprising at least one of: channel status, call status, transmission and reception status, and charging status. As shown in FIG. 5, the LED ring 128 may include LED elements 130, 132 placed around top and bottom portions of the ring 128 to indicate the power on/off status.

The portable communication device 100 further comprises a voice command button 134, a volume adjustment button 136, a power button 138, and an emergency button 140. The voice command button 134 and the volume adjustment button 136 are disposed on the left-side surface 120 of the housing 110. The power button 138 and the emergency button 140 may be disposed on the top surface 116 of the housing 110. In accordance with embodiments, when the emergency button 140 is depressed, the portable communication device 100 automatically sends an emergency signal over a pre-programmed frequency channel, for example, by reception by dispatch center and other communication devices. In accordance with some embodiments, the portable communication device 100 further includes a slot 142 disposed on the rear surface 114 of the housing 110. The slot 142 is adapted to display a quick response (QR) code or other suitable scannable code that can be used to provide one or more ownership experiences (e.g., device enrollment) to a user of the portable communication device 100. The portable communication device 100 also includes a slot 144 on the right-side surface 122 of the housing 110. The slot 144 may be adapted to receive a subscriber identification module (SIM).

The portable communication device 100 further includes an accessory connector interface 146 (e.g., 3.5 mm speaker connector interface) that is adapted to connect the portable communication device to a wired audio accessory such as a remote speaker microphone (RSM), or other remote audio accessory. The accessory connector interface 146 is disposed on a bottom surface 118 of the housing 110. The portable communication device 100 further comprises one or more charging pins 148 disposed on a rear surface 114 of the housing 110. The portable communication device 100 includes a charging connector interface 150 (e.g., USB-C interface) disposed on the bottom surface 118 of the housing 110.

Figure 6:
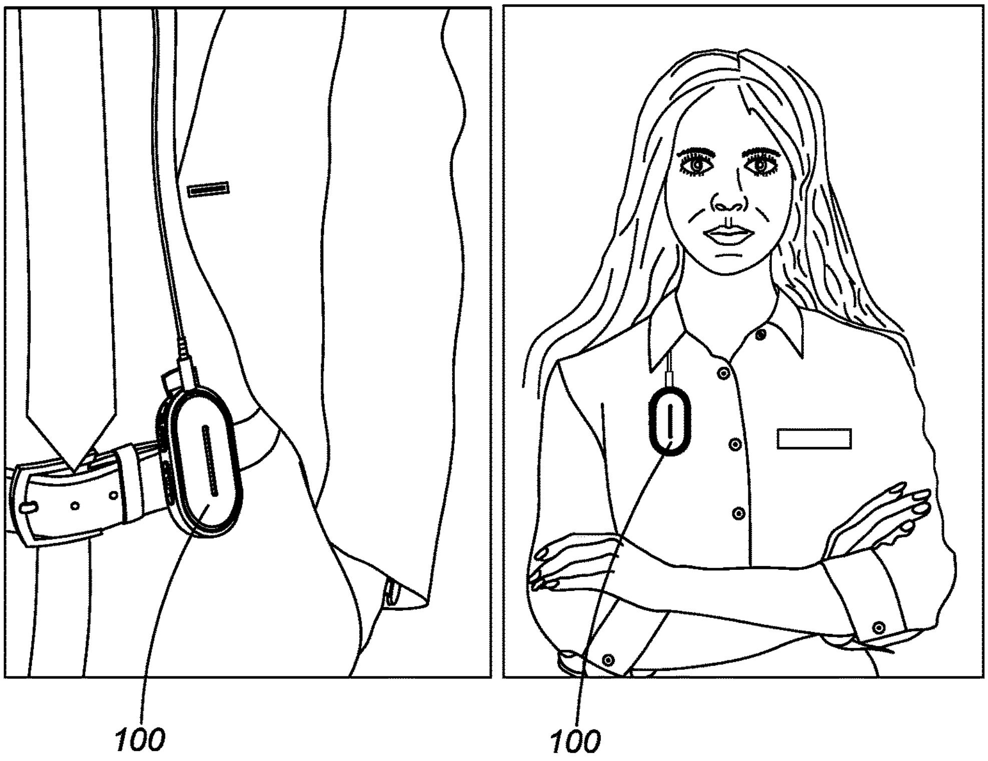
FIG. 6 illustrates examples of different wearable modes of operation associated with the portable communication device in accordance with some embodiments.

In accordance with embodiments, the rear surface 114 of the portable communication device 100 is configured to mount to clothing and/or a fixed surface. As shown in FIG. 6, the portable communication device 100 may be worn on the belt or the chest to offer better ergonomics to users (e.g., users operating in retail and hospital environments). When worn on the belt, the portable communication device 100 can be attached to a belt clip holster accessory.

Figure 7:
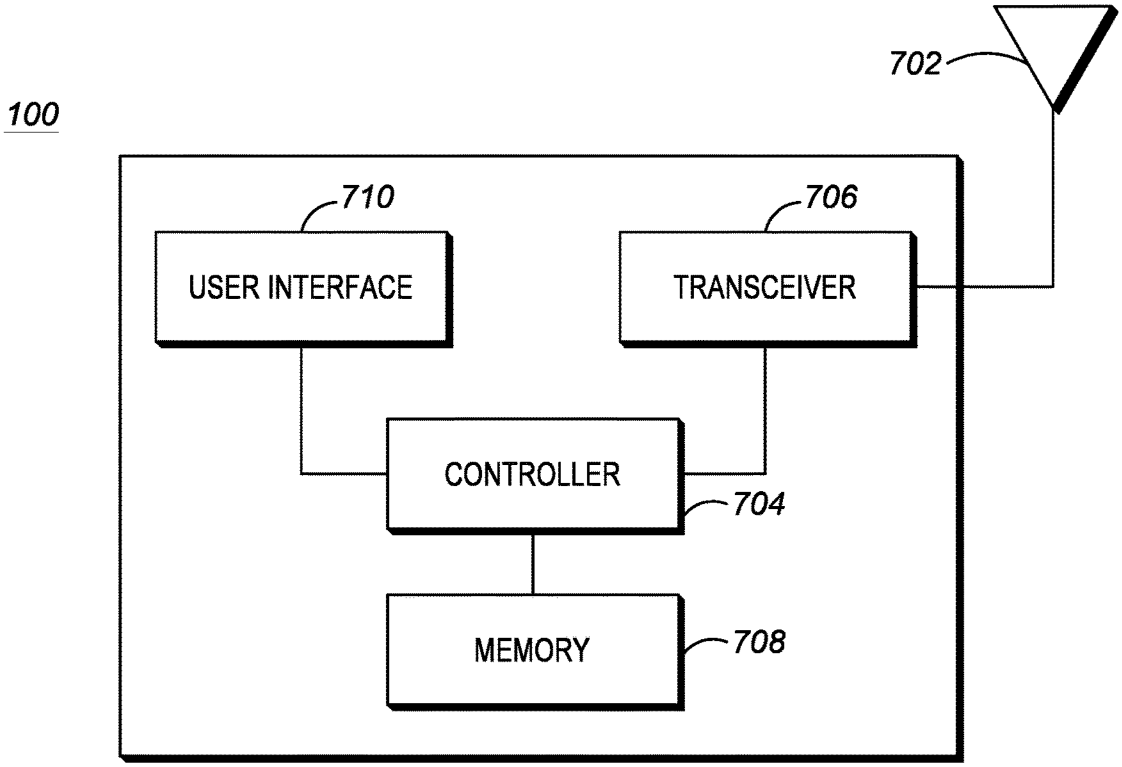
FIG. 7 is a block diagram of the portable communication device in accordance with some embodiments.

FIG. 7 is a block diagram illustrating the internal components of the portable communication device 100 in accordance with some embodiments of the invention. The components include an antenna 702, a controller 704, a transceiver 706, a memory 708, and a user interface 710. The user interface 710 may include one or more of the PTT button 124, voice command button 134, and emergency button 140. In accordance with the embodiment, the antenna 702 comprises any known or developed structure for radiating and receiving electromagnetic energy in the frequency range containing the wireless carrier frequencies. The antenna 702 is used for transmitting radio signal over one or more pre-programmed channels allocated for PTT communication.

In accordance with the embodiment, the transceiver 706 coupled to the controller 704 enables the portable communication device 100 to transmit and receive the RF signals through the antenna 702. In accordance with the embodiment, the transceiver 706 converts the RF signals received from the antenna 702 to digital data for use by the controller 704.

In accordance with the embodiment, the controller 704 is coupled to the transceiver 706, the memory 708, and the user interface 710. The controller 704 operates in conjunction with the data and instructions stored in the memory 708 to control the operation of the portable communication device 100. The controller 704 may be implemented as a processor, a digital signal processor, hard-wired logic and analog circuitry, or any suitable combination of these.

In accordance with the embodiment, the memory 708 is coupled to the controller 704 to store data and instructions for the operation of the controller 704. The memory 708 maintains a database that stores the information about talk-group channels that can be used by the portable communication device 100 for PTT communication.

In accordance with the embodiment, the user interface 710 coupled to the controller 704 detects when the PTT button 124 is pressed and in response sends a control signal to the controller 704 to activate the transmission of PTT signals on a talk group channel via the transceiver 706.

Figure 8:
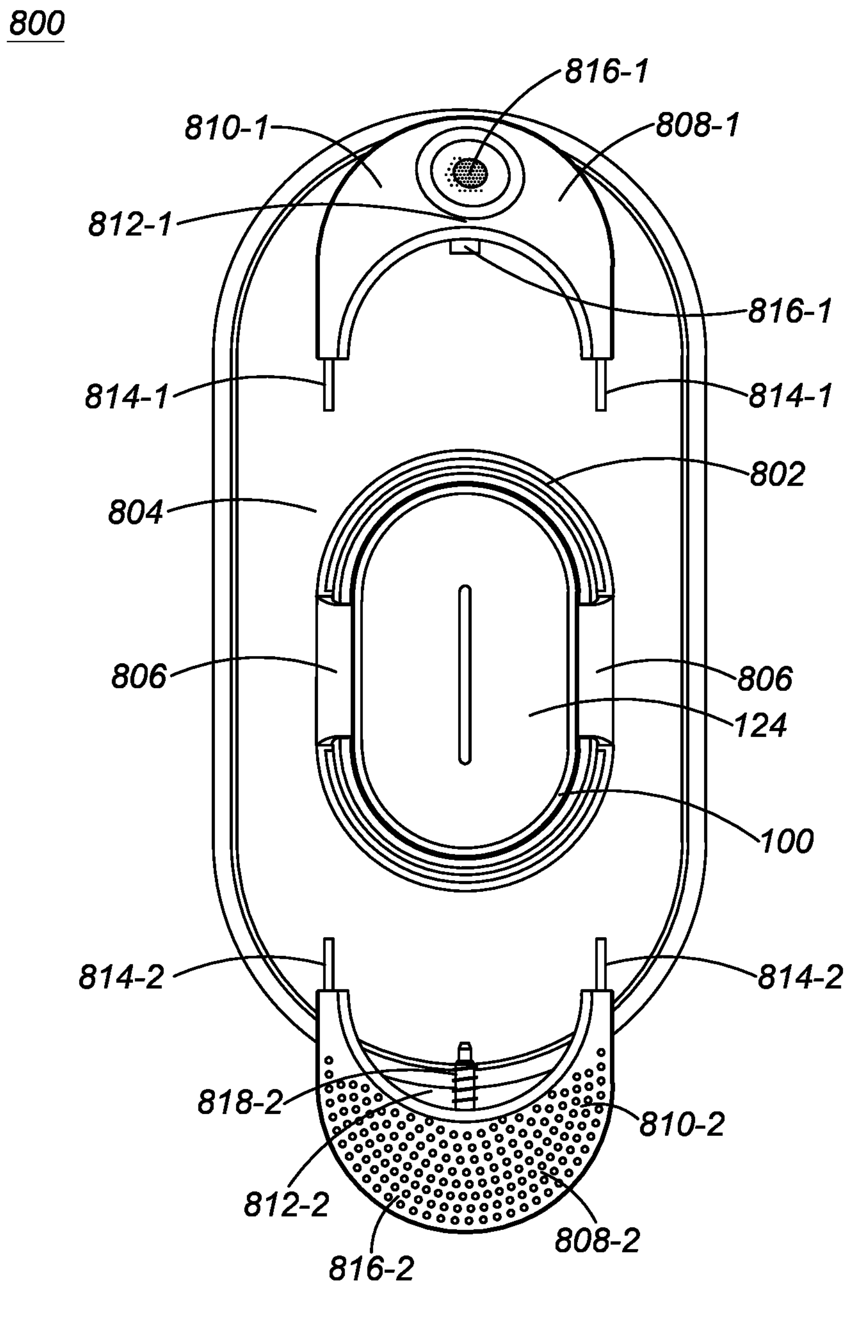
FIG. 8 illustrates a mounting apparatus for the portable communication device in accordance with some embodiments.

Referring now to FIG. 8, a mounting apparatus 800 for the portable communication device 100 in accordance with some embodiments. The mounting apparatus 800 includes a mounting plate 802 configured to be attached to a planar surface (804) (e.g., wall surface). The mounting plate 802 has one or more elastically bendable arms 806 protruding from a front surface of the mounting plate 802. In the example shown in FIG. 8, the arms 806 are disposed on the left and right edges of the front surface of the mounting plate 802. The arms 806 are adapted to engage around one or more peripheral portions on the left and right edges of the portable communication device 100 and to further secure the portable communication device with the mounting plate 802 as shown in FIG. 8.

The mounting apparatus 800 further comprises one or more modular accessories 808 (e.g., a camera accessory 808-1 and a speaker microphone accessory 808-2) including an accessory housing 810 having a cutout alignment feature 812 that is adapted to align with a top surface 116 or a bottom surface 118 of the portable communication device 100. The modular accessory 808 further includes one or more locking elements 814 disposed on the accessory housing 810. The locking elements 814 are adapted to be inserted into the one or more elastically bendable arms 806 by aligning the cutout alignment feature 812 with the top surface 116 or the bottom surface 118 of the portable communication device 100 when the portable communication device 100 is secured with the mounting plate 802. The modular accessory 808 further includes one or more modular electronic components 816 disposed in the accessory housing 810. In some embodiments, the modular accessory 808 includes a connector interface 816 disposed in the accessory housing 810. The connector interface 816 is adapted to connect the one or more electronic components 816 with the portable communication device 100. The connector interface 818 may have a first end that is connected to the one or more modular electronic components 816 and a second end that is connected to a cooperating connector interface (e.g., interface 146 or interface 150) disposed on the portable communication device 100.

Depending on the type of modular accessory 808, the modular electronic component 816 may include, but not limited to one or more of: a speaker, a camera, an electronic display, a network interface, a microphone, or a barcode speaker. In the example shown in FIG. 8, a camera accessory 808-1 is shown including a first accessory housing 810-1 having a first cutout alignment feature 812-1 adapted to align with a top surface 116 or a bottom surface 118 of the portable communication device 100. The camera accessory 808-1 further includes one or more first locking elements 814-1 disposed on the first accessory housing 810-1. The first locking elements 814-1 are adapted to be inserted within the one or more elastically bendable arms 806 of the mounting plate 802 by aligning the cutout alignment feature

812 with the top surface 116 or the bottom surface 118 of the portable communication device 100 when the portable communication device 100 is secured with the mounting plate 802. The camera accessory 808-1 further includes a video camera component 816-1. In one embodiment, the camera accessory 808-1 also includes a connector interface 818-1 that is connected to the video camera 816-1 on one end and to the portable communication device 100 on the other end via a cooperating connector interface such as the charging connector interface 150 (e.g., USB-C connector) disposed on the bottom surface 118 of the portable communication device 100.

In FIG. 8, a speaker microphone accessory 808-2 is also shown including a second accessory housing 810-2 having a second cutout alignment feature 812-2 adapted to align with a top surface 116 or a bottom surface 118 of the portable communication device 100. The speaker microphone accessory 808-2 further includes one or more second locking elements 814-2 disposed on the second accessory housing 810-2. The second locking elements 814-2 are adapted to be inserted within the one or more elastically bendable arms 806 of the mounting plate 802 by aligning the second cutout alignment feature 812-2 with the top surface 116 or the bottom surface 118 of the portable communication device 100 when the portable communication device 100 is secured with the mounting plate 802. The speaker microphone accessory 808-2 further includes a speaker microphone component 816-2. In one embodiment, the speaker microphone accessory 808-2 also includes a connector interface 818-2 that is connected to the speaker microphone component 816-2 on one end and to the portable communication device 100 on the other end via a cooperating connector interface such as the accessory connector interface 146 (e.g., 3.5 mm speaker interface) disposed on the top surface 116 of the portable communication device 100.

In accordance with embodiments, when the portable communication device 100 is operated while being handheld or while being mounted to a clothing or another accessory associated with the user (i.e., prior to the portable communication device being mounted to the mounting plate 802), the portable communication device 100 operates in a first communication mode where the PTT button 124 serves a half-duplex or full-duplex communication function. For example, depressing the PTT button 124 while the portable communication device operates in a half-duplex communication mode activates transmission of a PTT voice signal on a talk-group channel selected by the user. In accordance with some embodiments, the portable communication device 100 does not include an integrated speaker or microphone. In these embodiments, an audio accessory (such as a remote speaker microphone) may be connected to the portable communication device 100 (while being handheld or mounted to a clothing) to enable the user to perform a talkgroup call.

Figure 9:
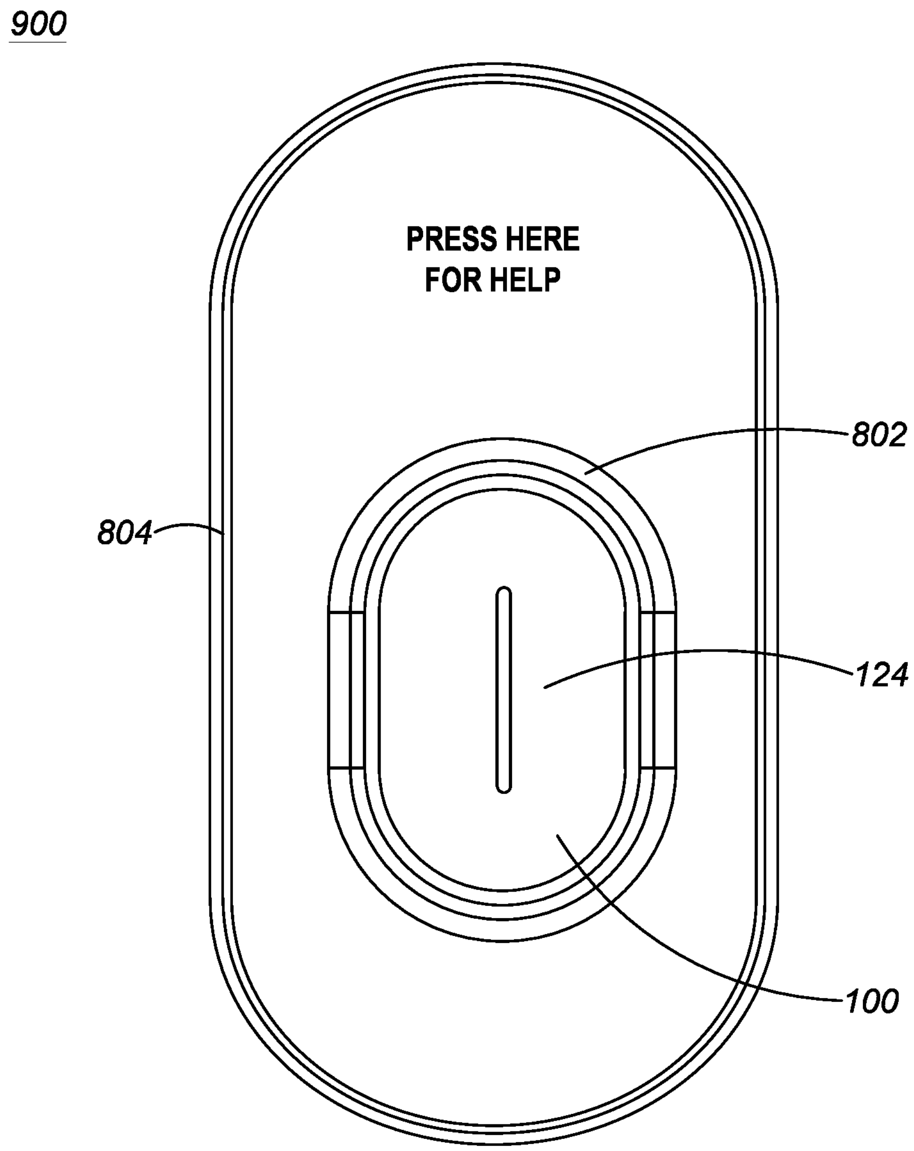
FIG. 9 illustrates a mode of operation associated with a portable communication device after being mounted to a mounting plate in accordance with some embodiments

Now referring to FIG. 9, a mounting system 900 is shown in which the portable communication device 100 is secured to a mounting plate 802 attached to a planar surface 804. In the configuration shown in FIG. 9, no modular accessory (e.g., camera accessory 808-1 or speaker microphone accessory 808-2) is aligned or otherwise connected with the portable communication device 100. In accordance with embodiments, the portable communication device 100 operates in a second communication mode when the portable communication device 100 is secured with the mounting plate 802 but not aligned with or connected to the modular accessory 808. In these embodiments, the PTT button 124 is configured to transmit a non-voice based signal notification (e.g., an emergency text notification) on a pre-programmed channel when the PTT button is pressed while the portable communication device 100 operates in the second communication mode. In these embodiments, the PTT button 124 may act like an emergency button instead of the conventional push-to-talk button. An alert will be automatically sent to one or more users (e.g., security) when the PTT button 124 is pressed. In some of these embodiments, when the portable communication device 100 does not have any of the speaker, microphone, or camera components integrated into the communication device 100, the portable communication device 100 may not transmit or receive voice or video-based signals (and instead may transmit only a text message) when the PTT button 124 is pressed.

In some embodiments, an electronic controller (e.g., controller 704) or sensor included in the portable communication device 100 or the mounting apparatus 800 is configured to detect whether the portable communication device 100 is secured with the mounting plate 802 and further automatically switch an operation of the portable communication device 110 from the first communication mode (e.g., half-duplex or full-duplex communication mode) to the second communication mode (e.g., non-voice based signal transmission mode) in response to detecting that the portable communication device 100 is secured with the mounting plate 802.

Figure 10:
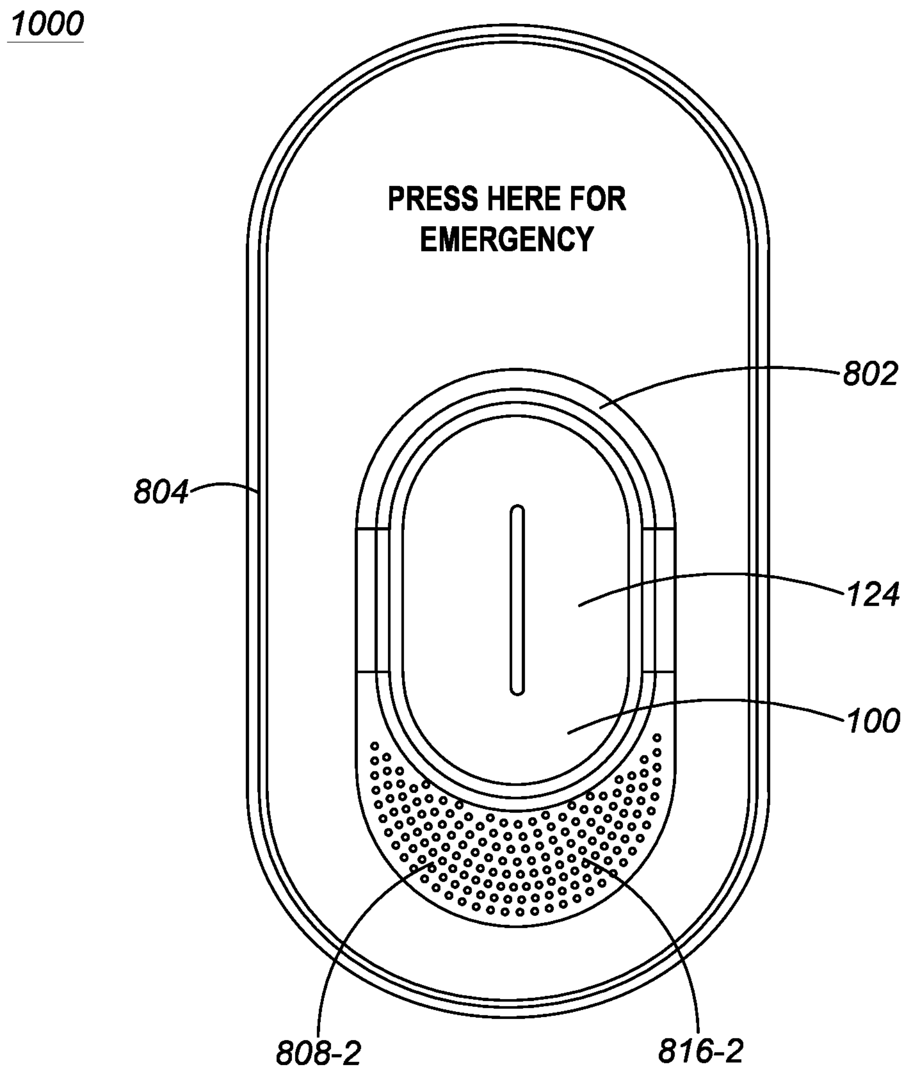
FIG. 10 illustrates a mode of operation associated with a portable communication device after being mounted to a mounting plate and aligned with a speaker microphone accessory in accordance with some embodiments.

Now referring to FIG. 10, a mounting system 1000 is shown in which a speaker microphone accessory 808-2 is aligned with and/or connected to the portable communication device 100 while the portable communication device 100 is secured to a mounting plate 802 attached to a planar surface 804. In accordance with embodiments, the portable communication device 100 operates in a third communication mode when the portable communication device 100 is secured with the mounting plate 802 and further aligned with or connected to the speaker microphone accessory 808-2. In these embodiments, the PTT button 124 is configured to establish a bidirectional half-duplex or full-duplex voice call (but not video call) via a pre-programmed channel using the speaker microphone accessory 808-2 when the PTT button 124 is pressed.

In some embodiments, an electronic controller (e.g., controller 704) or sensor included in the portable communication device 100 or the mounting apparatus 800 is configured to detect whether the speaker microphone accessory 808-2 is aligned with or connected to the portable communication device 100 and automatically switch an operation of the portable communication device 100 from the first or second communication modes (e.g., non-voice based signal transmission mode) to the third communication mode (e.g., voice communication mode) in response to detecting that the speaker microphone accessory 808-2 is aligned with or connected to the portable communication device 100.

Figure 11:
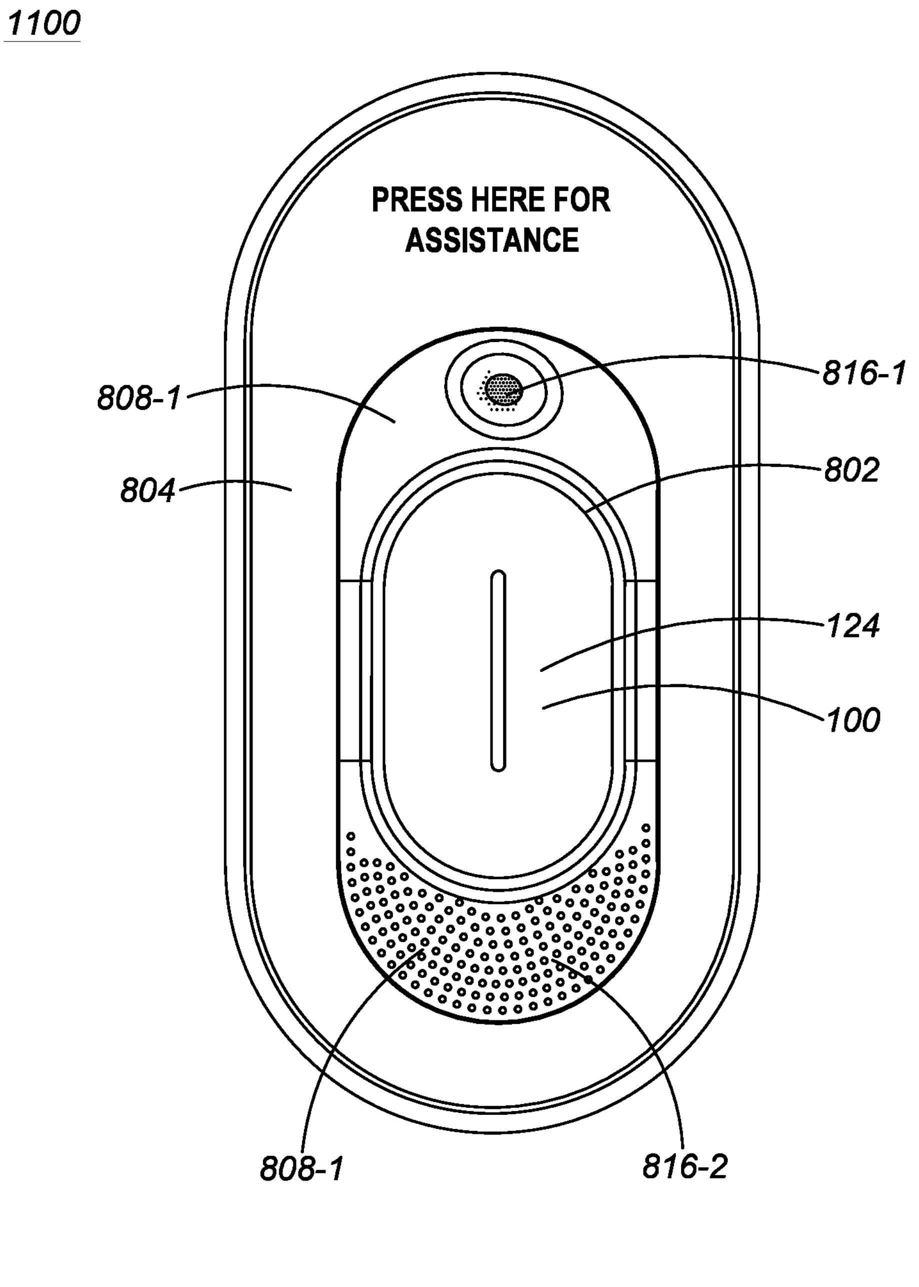
FIG. 11 illustrates a mode of operation associated with a portable communication device after being mounted to a mounting plate and aligned with a speaker microphone accessory and a camera accessory in accordance with some embodiments.

Now referring to FIG. 11, a mounting system 1100 is shown in which both camera accessory 808-1 and speaker microphone accessory 808-2 are aligned with and/or connected to the portable communication device 100 while the portable communication device 100 is secured to a mounting plate 802 attached to a planar surface 804. In accordance with embodiments, the portable communication device 100 operates in a fourth communication mode when the portable communication device 100 is secured with the mounting plate 802 and further aligned with or connected to the camera accessory 808-1 and speaker microphone accessory 808-2. In these embodiments, the PTT button 124 is configured to establish a bidirectional half-duplex or full-duplex audio-video call via a pre-programmed channel using the speaker microphone and camera accessories 808-1, 808-2 when the PTT button 124 is pressed while the portable communication device 100 operates in the fourth communication mode.

In some embodiments, an electronic controller (e.g., controller 704) or sensor included in the portable communication device 100 or the mounting apparatus 800 is configured to detect whether the camera accessory 808-1 and speaker microphone accessory 808-2 are aligned with or connected to the portable communication device 100 and automatically switch an operation of the portable communication device 100 from the first, second, or third communication modes (e.g., voice communication mode) to the fourth communication mode (voice and video communication mode) in response to detecting that the camera accessory 808-1 and speaker microphone accessory 808-2 are aligned with or connected to the portable communication device 100.

In the example shown in FIG. 11, an access control function may be optionally enabled when the camera accessory 808-1 is aligned with and/or connected to the portable communication device 100 while the portable communication device 100 is secured to a mounting to a mounting plate 802 attached to a planar surface 804. In this example, the PTT button 124 is configured to establish an access control function using the camera accessory 808-1 when the PTT button 124 is depressed. The access control function may be used to determine whether a user depressing the PTT button 124 is authorized to access a physical or intangible asset by comparing a feature (e.g., face) of the user captured with the camera component with pre-stored features of authorized users. For example, if the feature captured by a video camera component 816-1 of the camera accessory 808-1 matches a prestored feature of an authorized user, then the access control function allows the user to access a physical or intangible asset (e.g., by unlocking a door or providing data access) in accordance with a prestored policy.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “one of”, without a more limiting modifier such as “only one of”, and when applied herein to two or more subsequently defined options such as “one of A and B” should be construed to mean an existence of any one of the options in the list alone (e.g., A alone or B alone) or any combination of two or more of the options in the list (e.g., A and B together).

A device or structure that is “configured” in a certain way is configured in at least that way, but may also be configured in ways that are not listed.

The terms “coupled”, “coupling” or “connected” as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or “processing devices”) such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mounting apparatus for a portable communication device, the mounting apparatus comprising:

a mounting plate configured to be attached to a planar surface, the mounting plate having one or more elastically bendable arms adapted to engage around one or more peripheral portions of the portable communication device and to secure the portable communication device with the mounting plate; and a modular accessory including:

an accessory housing having a cutout alignment feature adapted to align with a top surface or a bottom surface of the portable communication device;

one or more locking elements disposed on the accessory housing, the locking elements adapted to be inserted within the one or more elastically bendable arms of the mounting plate by aligning the cutout alignment feature with the top surface or the bottom surface of the portable communication device while the portable communication device is already secured with the mounting plate; and one or more modular electronic components disposed in the accessory housing, wherein the portable communication device is configured to operate in a first communication mode prior to the portable communication device being secured with the mounting plate or connected to the one or more modular electronic components, and wherein the portable communication device is configured to operate in a second communication mode when the portable communication device is secured with the mounting plate but not connected to the one or more modular electronic components housed in the modular accessory.

2. The mounting apparatus of claim 1, wherein the modular accessory comprises a connector interface disposed in the accessory housing, the connector interface adapted to connect the one or more modular electronic components with the portable communication device.

3. The mounting apparatus of claim 2, wherein the connector interface has a first end and a second end, the first end of the connector interface being connected to the one or more modular electronic components housed in the modular accessory, the second end of the connector interface adapted to be connected to a cooperating connector interface disposed on the portable communication device.

4. The mounting apparatus of claim 1, wherein the portable communication device includes a front-facing push-to-talk (PTT) button, wherein depressing the PTT button while the portable communication device operates in the first communication mode activates transmission of a PTT voice signal on a selected talk-group channel.

5. The mounting apparatus of claim 1, wherein the portable communication device includes a front-facing push-to-talk (PTT) button, wherein depressing the PTT button while the portable communication device operates in the second communication mode activates transmission of a non-voice based signal on a pre-programmed channel.

6. The mounting apparatus of claim 1, wherein the portable communication device is configured to operate in a third communication mode when the portable communication device is secured with the mounting plate and further connected to one or more modular electronic components including a speaker component housed in the modular accessory.

7. The mounting apparatus of claim 6, wherein the portable communication device includes a front-facing push-to-talk (PTT) button, wherein depressing the PTT button while the portable communication device operates in the third communication mode establishes full-duplex or half-duplex voice calls via a pre-programmed channel.

8. The mounting apparatus of claim 6, wherein the portable communication device is configured to operate in a fourth communication mode when the portable communication device is secured with the mounting plate and further connected to one or more modular electronic components including a camera component and the speaker component housed in the modular accessory.

9. The mounting apparatus of claim 8, wherein the portable communication device includes a front-facing push-to-talk (PTT) button, wherein depressing the PTT button while the portable communication device operates in the fourth communication mode establishes one of: full-duplex or half-duplex video calls via a pre-programmed channel or an access control function.

10. The mounting apparatus of claim 1, wherein the portable communication device includes a housing and a push-to-talk (PTT) button disposed on a front surface of the housing, the PTT button occupying a substantial portion of the front surface of the housing, the PTT button further configured to be activable across the entirety of the PTT button surface.

11. A mounting apparatus for a portable communication device, the mounting apparatus comprising:

a mounting plate configured to be attached to a planar surface, the mounting plate having one or more elastically bendable arms adapted to engage around one or more peripheral portions of the portable communication device and to secure the portable communication device with the mounting plate;

an electronic controller configured to detect whether the portable communication device is secured with the mounting plate and further switch an operation of the portable communication device from a first communication mode to a second communication mode in response to detecting that the portable communication device is secured with the mounting plate; and a modular accessory including:

an accessory housing having a cutout alignment feature adapted to align with a top surface or a bottom surface of the portable communication device;

one or more locking elements disposed on the accessory housing, the locking elements adapted to be inserted within the one or more elastically bendable arms of the mounting plate by aligning the cutout alignment feature with the top surface or the bottom surface of the portable communication device while the portable communication device is already secured with the mounting plate; and one or more modular electronic components disposed in the accessory housing, wherein the portable communication device is configured to operate in the first communication mode prior to the portable communication device being secured with the mounting plate or connected to the one or more modular electronic components, and wherein the portable communication device is configured to operate in the second communication mode when the portable communication device is secured with the mounting plate but not connected to the one or more modular electronic components housed in the modular accessory.

12. The mounting apparatus of claim 11, wherein the portable communication device includes a front-facing push-to-talk (PTT) button, wherein depressing the PTT button prior to switching the portable communication device from the first communication mode activates transmission of a PTT voice signal on a selected talk group channel.

13. The mounting apparatus of claim 11, wherein the portable communication device includes a front-facing push-to-talk (PTT) button, wherein depressing the PTT button after switching the operation of the portable communication device to the second communication mode activates transmission of a non-voice based signal notification on a pre-programmed channel.

14. The mounting apparatus of claim 11, wherein the one or more modular electronic components comprises:

a speaker microphone component disposed on the accessory housing, wherein the controller is configured to detect whether the speaker microphone accessory is aligned with or connected to the portable communication device and switch an operation of the portable communication device from the first or second communication modes to a third communication mode in response to detecting that the modular accessory is aligned with or connected to the portable communication device.

15. The mounting apparatus of claim 11, wherein the one or more modular electronic components comprises:

a camera component disposed in the accessory housing, wherein the controller is configured to detect whether the camera accessory is aligned with or connected to the portable communication device and switch an operation of the portable communication device from the first or second communication modes to a third communication mode in response to detecting that the camera accessory is aligned with or connected to the portable communication device.

16. The mounting apparatus of claim 15, wherein the portable communication device includes a front-facing push-to-talk (PTT) button, wherein depressing the PTT button while the portable communication device operates in the third communication mode establishes one of full-duplex or half-duplex video calls via a pre-programmed channel or an access control function.

17. A mounting system comprising:

a portable communication device including a housing and a push-to-talk (PTT) button disposed on a front surface of the housing, the PTT button occupying a substantial portion of the front surface of the housing;

a mounting plate configured to be attached to a planar surface, the mounting plate having one or more elastically bendable arms adapted to engage around one or more peripheral portions of the portable communication device and to secure the portable communication device with the mounting plate; and a modular accessory including:

an accessory housing having a cutout alignment feature adapted to align with a top surface or a bottom surface of the portable communication device;

one or more locking elements disposed on the accessory housing, the locking elements adapted to be inserted within the one or more elastically bendable arms of the mounting plate by aligning the cutout alignment feature with the top surface or the bottom surface of the portable communication device while the portable communication device is already secured with the mounting plate; and one or more modular electronic components disposed in the accessory housing, wherein the portable communication device is configured to operate in a first communication mode prior to the portable communication device being secured with the mounting plate or connected to the one or more modular electronic components, and wherein the portable communication device is configured to operate in a second communication mode when the portable communication device is secured with the mounting plate but not connected to one or more modular electronic components housed in the modular accessory.

18. The system of claim 17, wherein the PTT button is configured to transmit a non-voice based signal notification when the PTT button is depressed.

* * * * *